(12) United States Patent
Mistry et al.

(10) Patent No.: US 7,271,142 B2
(45) Date of Patent: Sep. 18, 2007

(54) PROCESS FOR MAKING POLYMERIC PARTICLES

(75) Inventors: Kishor Kumar Mistry, Bradford (GB); Bryan David Grey, Bradford (GB)

(73) Assignee: Ciba Specialty Chemicals Water Treatments Ltd, Bradford (GB)

( * ) Notice: Subject to any disclaimer, the term of this patent is extended or adjusted under 35 U.S.C. 154(b) by 293 days.

(21) Appl. No.: 10/480,144

(22) PCT Filed: Jun. 14, 2002

(86) PCT No.: PCT/EP02/06550

§ 371 (c)(1),
(2), (4) Date: Dec. 8, 2003

(87) PCT Pub. No.: WO03/002248

PCT Pub. Date: Jan. 9, 2003

(65) Prior Publication Data

US 2004/0166165 A1 Aug. 26, 2004

(30) Foreign Application Priority Data

Jun. 27, 2001 (GB) .................................. 0115681.9

(51) Int. Cl.
*B01J 13/08* (2006.01)
*B01J 13/22* (2006.01)
*C11D 3/37* (2006.01)
*C11D 17/08* (2006.01)

(52) U.S. Cl. ...................... 510/296; 510/294; 510/295; 510/297; 510/298; 510/327; 510/349; 510/394; 510/438; 510/441; 510/475

(58) Field of Classification Search ................. 510/294, 510/295, 296, 297, 298, 327, 349, 394, 438, 510/441, 475

See application file for complete search history.

(56) References Cited

U.S. PATENT DOCUMENTS

| 5,324,445 A | 6/1994 | Langley et al. ........ 252/174.12 |
| 5,460,817 A | 10/1995 | Langley et al. ............. 424/408 |
| 2004/0089961 A1 | 5/2004 | Wulff et al. ................. 264/4.7 |

FOREIGN PATENT DOCUMENTS

| EP | 0626445 | 11/1994 |
| EP | WO97/24178 | * 7/1997 |
| WO | 92/20771 | 11/1992 |
| WO | 99/01533 | 1/1999 |

* cited by examiner

*Primary Examiner*—Brian Mruk
(74) *Attorney, Agent, or Firm*—Shiela A. Loggins

(57) ABSTRACT

A particulate composition comprising particles which consist of a shell wall surrounding a hydrophilic core, wherein the shell wall is formed from a polymeric coacervate and wherein the particles comprise a polymeric amphipathic stabiliser. Also claimed is a process of producing a particulate composition comprising particles which consist of a shell wall surrounding a hydrophilic core, comprising the steps of a) forming an aqueous liquid that contains a wall building material that is capable of forming the shell wall by coacervation, b) dispersing the aqueous liquid into a water immiscible liquid, which comprises a stabilising substance to form a dispersion that comprises aqueous droplets dispersed in a continuous phase of water immiscible liquid, c) subjecting the dispersion to coacervation conditions, such that the wall building material coacervates at the surface of the aqueous doplets, characterised in that the stabilising substance comprises a polymeric amphipathic stabiliser. Preferably the particulate composition obtainable by the process contains an active ingredient and is used in a detergent composition. The active ingredient preferably comprises any of detergency building ingredients, a buffering system and/or a sequesterant and/or detergent builder. Citric acid is a particularly preferred active ingredient.

40 Claims, 1 Drawing Sheet

PROCESS FOR MAKING POLYMERIC PARTICLES

Figure 1:
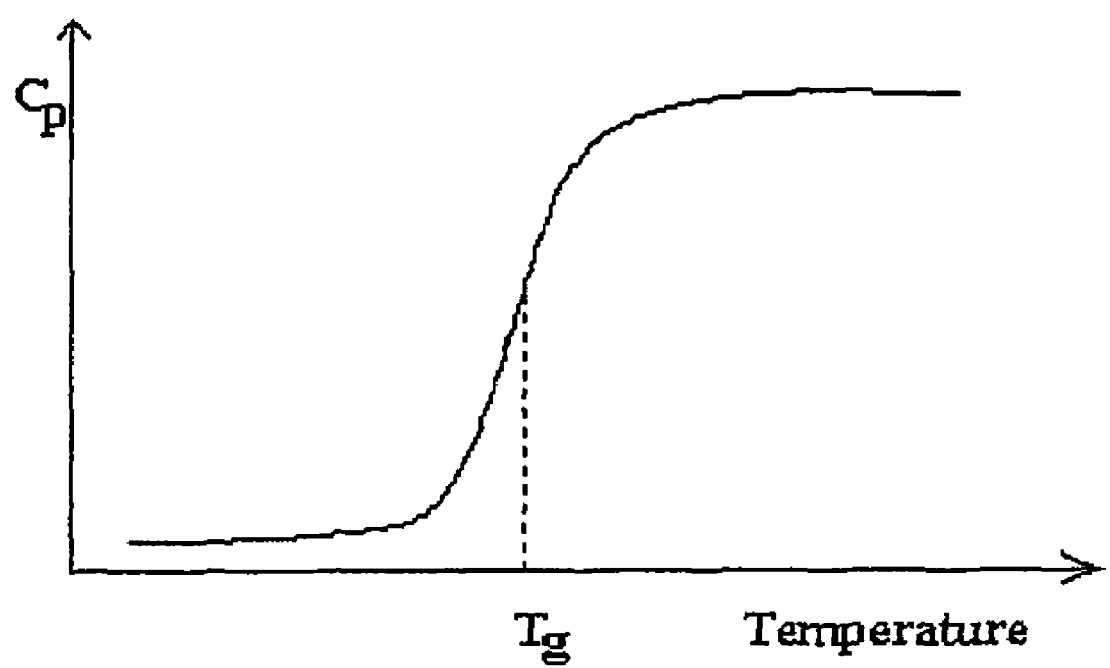

This invention relates to a novel process for making polymeric particles which consist of a shell surrounding a hydrophilic core which may be aqueous or anhydrous. Preferably the particles are additives for use in detergent compositions, particularly for use home laundry operations. In particular the invention concerns capsules containing encapsulated low molecular weight additives, such as buffering agents or sequesterants, which can be released either in the wash cycle or the rinse cycle of a laundry operation and single pack detergent compositions wherein the low molecular weight additives are designed to be released in order to improve for instance, detergency, rinsing or conditioning etc.

It is known to include various low molecular weight ingredients into detergent formulations. These ingredients include buffering agents, which are used adjust the pH of the wash water in order to ensure optimal efficiency. Typically such buffering agents include mixtures of bases and weak acids. Other low molecular weight additives include sequesterants, which are able to remove metal ions from solution. This may be important, for instance where high concentrations of calcium ions interfere with detergency or for instance high levels of iron ions bring about discoloration. Thus it may be necessary to include into the a sequesterant which is compatible with the detergent formulation. Suitable sequesterants may include EDTA, EDDHA or citric acid.

Inclusion of buffering agents or in particular sequesterants into detergent formulations, can interfere with other ingredients comprised in the detergent formulations. This is particularly a problem in modern detergent formulations which contain a complex mixture of many different formulations. It would therefore be desirable to provide such low molecular weight additives in the form of delayed release components, such that the additives are only released during the wash or rinse cycles.

It is known to provide delayed release compositions by entrapment of the active ingredients.

Entrapment of active ingredients can be achieved by a number of processes. Some of these techniques involve forming a polymeric shell around a central core or active ingredient. Other methods involve preparing a matrix of polymeric material throughout which an active ingredient is distributed.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper. Generally these capsules are designed to release the core material, when the shall wall is ruptured by external forces, e.g. by compression. Such a release method would be unsuitable for using a a detergent composition.

Typical techniques for forming a polymer shell are described in, for instance, GB 1,275,712, 1,475,229 and 1,507,739, DE 3,545,803 and U.S. Pat. No. 3,591,090. Generally these processes employ a continuous aqueous phase into which the shell forming materials are dissolved.

In U.S. Pat. No. 3,838,007 droplets of enzyme dispersed in an aqueous solution of, for instance, gelatin are dispersed into water and then cross-linked, to give cross linked particles of the gelatin containing the enzyme.

In EP-A-356,240 processes for encapsulating enzyme or other biologically produced material; in a matrix of polymeric material by mixing the polymeric material with aqueous liquor containing the biologically produced material, dispersing this mixture in a water immiscible liquid and azeotroping the dispersion. The product can either be relatively coarse beads that can be recovered or a stable dispersion of small particles in the water immiscible liquid.

In EP-A-356,239 there is a description of various compositions and processes primarily intended for the encapsulation of enzymes for liquid or other detergents. One type of product described therein comprises particles having a core comprising matrix polymer containing the enzyme, oil around the core and a polymer shell around the oil.

Particles of a matrix polymer containing an active ingredient can be formed as a dispersion in oil and this dispersion can then be dispersed in aqueous solution of an encapsulating polymer or blend of polymers and polymer deposition can then be caused to occur around the oil particles that contain the particles of matrix polymer that contain the active ingredient.

U.S. Pat. No. 5,744,152 describes a process for forming polymer particles introduced as a solution of a water soluble salt with a volatile amine of a polymer that is relatively insoluble and non-swelling in acid throughout which the active ingredient is dispersed or dissolved, and which the solution is heated to form the dry matrix and to volatilise the amine and thereby form a polymer that is insoluble in acid. The release of an active ingredient can be controlled by careful adjustment of the pH. This method is specifically designed for the entrapment of relatively large sized ingredients, in particular enzymes, fungi, spores, bacteria, cells or antibiotics, which are released by pH adjustment as a suitable release mechanism. This process does not provide capsules, but instead produces a matrix of polymer throughout which the active ingredients is ditributed.

WO 97/24178 describes a particulate composition comprises particles having a polymeric matrix including a detergency active ingredient, wherein the polymeric matrix is formed of a free base form of a cationic polymer which is a co-polymer of an ethylenically unsaturated hydrophobic monomer with an ethylenically unsaturated substituted amine monomer. The matrix particles can be made by polymerising the free base monomer and the hydrophobic monomer while dissolved in an organic solvent so as to form a solution of the free base polymer inorganic solvent. This is followed by addition of an aqueous solution of a volatile acid wherein the solvent has higher volatility than the acid. The solvent is then distilled off so as to leave a solution in water of the salt form of the polymer. A suitable volatile acid is acetic acid, in which event a suitable solvent is n-butyl acetate. The active ingredients particularly include detergent actives, including enzymes which are released during the wash cycle.

WO9220441 describes encapsulated particles comprising a core surrounded by a coacervate coating that comprises a low critical solution temperature polymer and a water removal depressant for the temperature of reversible insolubilisation of that polymer. The composition is made by forming a dispersion of the water insoluble core particles in a solution of the polymer, heating the solution to cause it to precipitate as a coacervate, and then adding the depressant. The composition can be an aqueous dispersion or dry particles. In this process the LCST wall building material coacervates from the exterior. To prevent the encapsulated particles of the invention coagulating and subsequently phase separating in the environment in which they are to be used, an entropic stabilising polymer, such as carboxymethyl cellulose, sodium alginates or starch, can be mixed with the LCST polymeric component prior to encapsulation. Such polymers can act as dispersants in conditions of high salt concentration, e.g. in certain detergent environments.

Processes of forming capsules involving coacervation are known. Generally aminoplast capsules are formed by distributing a water immiscible liquid in an aqueous liquid containing the aminoplast precursor, for instance a melamine formaldehyde resin. The capsule wall is formed by coacervation of the prepolymer onto on the droplets of water immiscible liquid. Thus the capsule wall is built up from the exterior by coacervation of the prepolymer from the aqueous continuous phase.

However, such processes are not useful when the material to be encapsulated is hydrophilic, especially an aqueous liquid. Various attempts have been made to solve this problem. For instance in U.S. Pat. No. 4,157,983 capsules containing water-dispersible material are said to formed from an admixture of low HLB emulsifier, oily water-immiscible solvent for the emulsifier urea-formaldehyde prepolymer water-dispersible material, and water. This admixture is agitated to form a water-in-oil emulsion to which amphiphatic acidic catalyst is added to cure the prepolymer. After curing to solid form, the capsules are separated from the remaining liquid of the admixture. However, this process has the disadvantage in that the prepolymer tends to coacervates to form a matrix rather than capsules.

This problem was recognised in WO-A-9828975, which attempted to overcome the problem. The reference describes forming capsules by heating an emulsion containing an aqueous dispersed phase containing a melamine formaldehyde prepolymer. The problem is said to be overcome by including in the oil phase a surface active proton transfer catalyst which is soluble in the organic liquid. Generally the proton transfer catalyst is an acidic material which is essentially oil soluble and at most very slightly soluble in water. The proton transfer catalyst is usually a sulfonic acid having at least 20 carbon atoms in the molecule.

However, the presence of the proton transfer catalyst will inevitably affect the surface characteristics of the capsules that are formed. Thus it would be desirable to provide an alternative process for forming capsules by a reverse phase coacervation process, wherein the capsules contain hydrophilic (especially aqueous material). It would be more desirable to provide such a process which avoids the use of a proton transfer catalyst.

Although there are processes for encapsulating hydrophilic (eg aqueous) materials described in the prior art, there is nonetheless a need for an alternative processes. In particular there is a need for an improved process for making capsules by coacervation of water soluble or water dispersible wall building materials.

Furthermore there is a need for products where the release of the aqueous core material can be controlled more reliably. Hence it is an objective of the present invention is to provide shell core products which satisfy this requirement.

Furthermore all of the aforementioned references which provide delay release products wherein the release mechanism is suitable for use in a detergent composition are concerned with entrapment or encapsulation of large bulky entities, for instance enzymes or higher molecular weight active ingredients e.g. polymers. However, such delay release products are unsuitable for low molecular weight compounds, such as monomeric acids, sequesterants and the like, since these compounds tend to be released slowly prior to use.

Therefore there is a need for a delay release product which is capable of retaining low molecular compounds, such as acids, bases and sequesterants, and only released when a suitable trigger mechanism is employed. In particular there is a need to a delay release product as a component of a detergent formulation, which product contains a low molecular weight additive, such as a buffering system or a sequesterant, wherein the additive is only released upon dilution of the detergent formulation. Preferably the additive should only be released immediately prior to or during a wash or rinse cycle.

Thus it is also an objective of the present invention is to provide particles which contain entrapped low molecular weight ingredients. In particular the invention is concerned with controlling the release of additives in to a detergent system. Specifically it would be desirable to provide a polymer entrapped buffering agents or sequesterants which only release the active ingredient immediately prior to or during the wash or rinse cycles. In particular it would desirable to provide such products where the additive is citric acid.

According to one aspect of the invention we provide a particulate composition comprising particles which consist of a shell wall surrounding a hydrophilic core, wherein the shell wall is formed from a polymeric coacervate and wherein the particles comprise a polymeric amphipathic stabiliser.

Furthermore we provide a novel process of producing a particulate composition comprising particles which consist of a shell wall surrounding a hydrophilic core, comprising the steps of a) forming an aqueous liquid that contains a wall building material that is capable of forming the shell wall by coacervation, b) dispersing the aqueous liquid into a water immiscible liquid, which comprises a stabilising substance to form a dispersion that comprises aqueous droplets dispersed in a continuous phase of water immiscible liquid, c) subjecting the dispersion to coacervation conditions, such that the wall building material coacervates at the surface of the aqueous doplets, characterised in that the stabilising substance comprises a polymeric amphipathic stabiliser.

The continuous phase may be any suitable water immiscible liquid. The water immiscible liquid may be a silicone oil, but is preferably a hydrocarbon, for instance a cyclic or straight chain aliphatic hydrocarbon, typically having between 8 and 12 carbon atoms.

The presence of amphipathic polymeric stabiliser in the water immiscible liquid is essential for the successful formation of capsules as opposed to a matrix of coacervate. A suitable stabiliser is desirably formed from a monomer blend comprising a blend of an ethylenically unsaturated hydrophilic monomer and an ethylenically unsaturated hydrophobic monomer. The polymeric stabiliser may be for instance a copolymer of ethylenically unsaturated polycarboxylic acid (including dicarboxylic acid and the anhydrides) such as maleic acid or maleic anhydride. Preferably the stabiliser is a random copolymer of a blend of hydrophobic monomers selected from styrene and alkyl (meth) acrylates and hydrophilic monomers comprising ethylenically unsaturated polycarboxylic acid, i.e. an ethylenically unsaturated monomer containing a multiplicity of carboxylic acids.

The stabilisers can be included in an amount up to 2% by weight, based on dry weight of prepolymer. More preferably the stabiliser is usually included in amounts between 0.1% to 1%, especially around 0.5%. This can improve the stability of the dispersion and may also lead to a more uniform particle size distribution. Typically the particles have a size of up to 1,000 microns, usually in the range 750 nanometers to 500 microns, typically 100 to 200 microns.

During the process of coacervation the polymeric amphipathic stabiliser is thought to be in association with the surface of the aqueous droplets. This association may be a physical attraction or it could be chemical bonding. It is possible that there is some covalent bonding that occurs although it is thought that any covalent bonding that occurs is minimal. It is thought that it is more likely that there is an association between the stabilser and the surface of the droplets. This ionic association is for instance an ionic association between ionic groups on the stabiliser and ionic groups in the coacervate and/or the coacervating prepolymer.

However, whatever the mechanism is responsible for the improved capsules obtained by the process, it is surprising that the presence of the polymeric amphipathic stabiliser in the water immiscible liquid actually prevents coacervation from occuring throughout the matrix of the particles. Thus formation of true capsules by this particular route is unexpected.

Processes for providing true capsules containing a wall material containing a coacervated shell wall, for instance an aminoplast resin have usually only been made using an aqueous continuous phase and in which the shell wall building material is contained in the aqueous continuous phase. Thus generally in previous processes the shell wall is built up from the outside.

The composition of the present invention comprises capsules and is desirably obtained by the reverse phase coacervation process of the present invention, in which a polymeric amphipathic stabiliser is present in a continuous water immmiscible liquid phase has not previously been contemplated. The particles of the present invention are desirably prepared by a novel process in which the coacervate forming materials are dissolved in an aqueous discontinuous phase, which is distributed throughout a non-aqueous continuous phase. Once this dispersion is formed, the capsules may be conveniently formed by employing suitable coacervation conditions.

Thus particles of the invention desirably consisting of a hydrophilic core material within an shell wall in which the shell wall is actually built up from within the particles. The particles formed by the process preferably also comprise the polymeric amphipathic stabiliser located at the surface. Generally the stabiliser at least partially coats the shell wall. More preferably the polymeric amphipathic stabiliser coats substantially all of the shell wall.

Thus in one aspect of the invention we provide a particulate composition comprising particles which consist of a shell wall surrounding a hydrophilic core material, wherein shell wall is an aminoplast resin.

According to this form of the invention we provide a convenient process for providing the particulate composition. Thus according to this aspect the aqueous phase comprises an aminoplast forming substance, for instance a melamine/formaldehyde prepolymer and active ingredient. This aqueous phase is dispersed into an water immiscible continuous phase to form a water in oil dispersion. The thus formed dispersion is stirred throughout the process in order to maintain the stability of the polymerising particles. The dispersion should then be heated to at least 50° C. for instance 60 and 90° C. for several hours thus forming particles containing the active ingredient in a core which is surrounded by an aminoplast shell wall. Preferably the dispersion is heated to between 65 and 75° C. for between 2 and 3 hours. The dispersion of aminoplast particles may be dehydrated using vacuum distillation to provide substantially dry particles. When the shell wall is an aminoplast resin, it is generally formed from a prepolymer of an compound containing at least two amide and/or amine groups with and aldehyde. Preferably the prepolymer is a urea formadehyde resin or melamine formaldehyde resin. A particularly preferred prepolymer is melamine formaldehyde resin Beetle PT 336. A suitable urea formaldehyde prepolymer can be formed by forming an aqueous solution of formaldehyde (e.g. 30 to 50% by weight) at a pH between 7 and 8 and combining with urea. The weight ratio of urea to formaldehyde is desirably between 1:6 and 1:10, preferably about 1:8.

Alternatively the shell may be formed from a wall building material which is a LCST (Low Critical Solution Temperature) polymer. Typically such polymers are fully soluble in water at relatively low temperatures. However, above a particular temperature the solution of polymer will phase separate into a polymer rich phase and a polymer depleted phase. Generally the polymer rich phase will contain all or at least most of the LCST polymer whilst the polymer depleted phase will contain no or a lesser amount of the LCST polymer.

The LCST polymer can be a naturally occurring polymer such as certain cellulose derivatives, such as the methyl, hydroxy propyl, and mixed methyl/hydroxy propyl cellulose ethers. However it is generally preferred for the LCST polymer to be a synthetic polymer formed by polymerisation of what can be termed an LCST monomer either as a homopolymer or as a copolymer with a hydrophilic monomer that is present in an amount insufficient to cause the LCST temperature to be unacceptably high. Suitable LCST monomers include N alkylacrylamide, N,N-dialkylacrylamide, diacetone acrylamide, N-acryloylpyrrolidine, vinyl acetate, certain (meth) acrylate esters (especially hydroxypropyl esters), styrene, and various other vinyl monomers, especially Nvinylimidazoline and the like.

When the LCST polymer is a copolymer, the comonomer is usually hydrophilic and can be non-ionic or ionic.

Suitable non-ionic monomers include acrylamide, hydroxyethyl acrylate, vinyl pyrollidone, or hydrolysed vinyl acetate.

Anionic or cationic monomer can be used in place of or in addition to the non-ionic comonomer to form a copolymer or terpolymer with the LCST monomer respectively. Suitable anionic monomers include ethylenically unsaturated carboxylic or sulphonic acid monomers, for example (meth) acrylic acid and alkaline salts thereof, and 2-acrylamido methyl propane sulphonic acid. Suitable cationic monomers include dialkylaminoalkyl (meth)acrylates and acrylamides as acid addition or quaternary ammonium salts, for example dialkylaminoethyl (meth)acrylate acid addition salts.

A preferred LCST polymer is a polyvinyl alcohol prepared by partial hydrolysis of polyvinyl acetate. The polyvinyl alcohol may contain as much as 60% vinyl acetate units and thus would be considered to have a relatively low degree of hydrolysis. Alternatively the degree of hydrolysis may be as high as 95%, thus only contains 5% unhydrolysed vinyl acetate units. Preferably the degree of hydrolysis is between 60 and 80%, preferably around 75%.

In this aspect of the invention the coacervation conditions will generally comprise elevating the temperature to above the critical solution temperature such that the polymer solution will phase separate as described above. In the process the polymer rich phase will occur at the exterior of the particles. The LCST polymer will deposit at the surface. As the process proceeds the LCST polymer deposits form a coherent film or membrane which becomes the capsule shell wall. Since the coacervation process involving an LCST polymer is frequently reversible, it will be generally necessary to stabilise the shell in order to prevent it from redissolving or dispersing in the aqueous phase. Thus the shell wall can be made permanent. This is achieved most desirably by crosslinking the deposited LCST polymer. The crosslinking process can be acheived by any multifunctional compound that can react with two or more functional groups that occur on the LCST polymer. Aldehydes have been found to be particularly effective for the cross-linking stage. A preferred aldheyde is glutaraldehyde.

In another form of the invention the wall building material is a salt of an ionisable polymer with a volatile counterion. Thus the polymer may comprise free acid or free base groups and typically the counterion is derived from a volatile compound.

Desirably the ionisable polymer is selected from polymers of an ethylenically unsaturated free base amine, wherein the counterion is derived from a volatile acid, preferably acetate. When the ionisable polymer contains a free base it is preferably formed from a co-polymer of (a) an ethylenically unsaturated hydrophobic monomer with (b) a free base monomer of the formula $$CH_2=CR_1COXR_2NR_3R_4$$

where $R_1$ is hydrogen or methyl, $R_2$ is alkylene containing at least two carbon atoms, X is O or NH, $R_3$ is a hydrocarbon group and $R_4$ is hydrogen or a hydrocarbon group. The hydrocarbon group may be any straight, branched or cyclic hydrocarbon group. It may be aromatic but is preferably aliphatic. Preferably $R_3$ is at least 4 carbon atoms. More preferably $R_3$ is t-butyl and $R_4$ is hydrogen. More preferably $R_1$ is methyl, $R_2$ is ethylene and X is O.

We have found that polymers formed from the special combination of hydrophobic monomer that are capable of forming a homopolymer of glass transition temperature in excess of 50° C., preferably greater than 60 or 80° C. exhibit considerably improved performance in regard to the impermeability to the fabric conditioner until the particles are exposed to a suitably dilute environment. By hydrophobic monomer we mean that the monomer has a solubility in water of less than 5 g per 100 ml water at 25° C.

Glass transition temperature (Tg) for a polymer is defined in the Encyclopedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC). Thus a reference sample with known Tg and the experimental sample are heated separately but in parallel according to a linear temperature programme. The two heaters maintain the two samples at identical temperatures. The power supplied to the two heaters to achieve this is monitored and the difference between them plotted as a function of reference temperature which translates as a recording of the specific heat as a function of temperature. As the reference temperature is increased or decreased and the experimental sample approaches a transition the amount of heat required to maintain the temperature will be greater or lesser depending on whether the transition is endothermic or exothermic. A typical plot indicating the glass transition temperature is shown in FIG. 1.

Alternatively the hydrophobic monomer can be any ethylenically unsaturated monomer which is insoluble in water, for instance generally having a partition coefficient K between hexane and deionised water at 20° C. of at least 5 and preferably at least 10.

A particularly preferred ionisable polymer includes a co-polymer of 55-85 weight % of methyl methacrylate with 15%-45% by weight tertiary butylamino-ethyl methacrylate.

Alternatively the ionisable polymer may be selected from polymers of an ethylenically unsaturated free acids, wherein the counterion is derived from a volatile base, preferably ammonia or a volatile amine. Preferably the ionisable polymer is formed from a co-polymer of (a) an ethylenically unsaturated hydrophobic monomer with (b) a free carboxylic acid monomer. The carboxylic acid monomer may be itaconic acid, maleic acid but is preferably either acrylic acid or methacrylic acid.

The hydrophobic monomer may be as defined above for the ionisable polymer containing fee base groups. A preferred polymer is a co-polymer of 55-85 weight % of methyl methacrylate with 15%-45% by weight ammonium methacrylate. The coacervation conditions suitable for this polymer would be the same as for the ionisable polymer containing fee base groups. Suitably though the crosslinking process should be adapted so that the cross-linking agent will readily react with functional groups in the ionisable polymer, desirably groups that will react with free acid groups. Suitably the cross-linking agent could include multifunctional compounds containing epoxides, amines etc. Alteratively the cross-linking agent may include multivalent metal ions, for instance calcium, zirconium or aluminium.

The shell wall can be designed to have special release characteristics. For instance the shell wall can be a semi-permeable membrane and thus is permeable to water but not to larger molecules. Thus when these particles are expose to very concentrated exterior environments the shell remains intact, but when the capsules are exposed to more dilute aqueous environments, for instance the wash water or rinse water in a laundry operation, there is a high osmotic pressure and water will enter the capsules and the capsule wall will rupture.

Thus we provide a detergent composition comprising detergency building ingredients and particles which consist of a shell wall surrounding a core material, wherein the shell wall comprises an coacervate polymer, especially an aminoplast resin and the core material comprises a water soluble active ingredient.

Furthermore, we have found that the shell walls comprising the coacervate resin, preferably where this is an aminoplast polymer, prevent release of the low molecular weight active, until a suitable trigger has occured. Thus the particles will retain the low molecular weight substance when the particles are contained in a detergent concentrate, but rupture and release the active when exposed to the more dilute environment in the wash or rinse cycles.

The hydrophilic core material is preferably water soluble. The core material may be aqueous or anhydrous. More preferably the core comprises a low molecular weight active, for instance a compound of molecular weight of less than 1,000. Normally the active is a compound of considerably lower molecular weight, preferably below 500. Desirably the active can be a solid but generally is a liquid at 25° C. It generally has a solubility in water of at least 5 g/100 ml of water at 25° C. and thus the active is normally soluble in the wash or rinse water. The active may be inorganic but preferably is organic. It can be, for instance, a mineral acid but more usually comprises a carboxylic acid. Preferably the active ingredient comprises a buffering system, typically comprising a carboxylic acid and a base. More preferably the active ingredient is a sequesterant or detergent buider, for instance diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g. SKS-6 from Hoechst). The active ingredient includes other compounds containing at least two carboxylic acid groups, and optionally amino groups. A particularly preferred active is citric acid.

Alternatively the active ingredient may be a fabric conditioner, such as quaternary ammonium salts having only one long chain acyclic aliphatic hydrocarbon group (such as monostearyltrimethyl ammonium chloride). Suitable fabric conditioners also include nonquaternary amide-amines, such as the reaction product of higher fatty acids with hydroxy alkyl alkylene diamines, for instance reaction product of higher fatty acids and hydroxyethylethylenediamine (See "Condensation Products from beta-Hydroxyethylethylene-diamine and Fatty Acids or Their Alkyl Esters and Their Application as Textile Softeners in Washing Agents," H. W. Eckert, Fette-Seifen-Anstrichmittel, September 1972, pages 527-533). These materials are usually cited generically along with other cationic quaternary ammonium salts and imidazolinium salts as softening actives in fabric softening compositions. (See U.S. Pat. No. 4,460,485, Rapisarda et al., issued Jul. 17, 1984; U.S. Pat. No. 4,421,792, Rudy et al., issued Dec. 20, 1983; and U.S. Pat. No. 4,327,133, Rudy et al., issued Apr. 27, 1982, all of said patents being incorporated herein by reference). U.S. Pat. No. 3,775,316, Berg et al., issued Nov. 27, 1973, incorporated herein by reference, discloses a softening finishing composition for washed laundry containing (a) the condensation product of hydroxyalkyl alkylpolyamine and fatty acids and (b) a quaternary ammonium compound mixture of (i) from 0% to 100% of quaternary ammonium salts having two long chain alkyl groups and (ii) from 100% to 0% of a germicidal quaternary ammonium compound. Desirably the fabric conditioners may be fabric softeners disclosed in EP 398137, U.S. Pat. No. 3,861,870, U.S. Pat. No. 4,308,151, U.S. Pat. No. 3,886,075, U.S. Pat. No. 4,233,164, U.S. Pat. No. 4,401,578, U.S. Pat. No. 3,974,076 or U.S. Pat. No. 4,308,016, The particles can be designed to have particular release requirements. For instance it may be desirable that the particles release the active ingredient in the wash cycle of a laundry operation only. Alternatively it may be necessary that the active ingredient is only released in the rinse cycle. This can be controlled by controlling the thickness of the shell wall. The rate of release of the active can also be controlled by the thickness of the shell wall.

The particles can also be modified by applying a coating to the surface of the coacervate shell wall. Preferably the coating is an ionisable polymer. For instance the coating may be a copolymer of an ethylenically unsaturated hydrophobic monomer with an ethylenically unsaturated ionic monomer.

The coating may allow the release characteristics of the particles to be varied. In addition particles containing a coating may also be more durable, for instance where the coacervate shell wall is relatively thin.

Thus in one preferred aspect the particles comprise a shell wall which comprises a membrane of coacervate polymer, especially an aminoplast polymer, onto which has been coated an ionisable polymeric resin. Thus the membrane is substantially impervious to the low molecular weight actives. However the membrane may allow the passage of water into the capsule. Thus in this instance the membrane is semipermeable.

The coating may typically be an ionisable polymer. Thus the polymer may comprise free acid or free base groups and typically the counterion is derived from a volatile compound.

Preferably the ionisable polymer coating is formed from a co-polymer of (a) an ethylenically unsaturated hydrophobic monomer with (b) a free base monomer of the formula

$$CH2=CR_1COXR_2NR_3R_4$$

where $R_1$ is hydrogen or methyl, $R_2$ is alkylene csontaining at least two carbon atoms, X is O or NH, $R_3$ is a hydrocarbon group and $R_4$ is hydrogen or a hydrocarbon group.

It is generally preferred that one of the hydrocarbon groups on the nitrogen atom of the free base monomer is greater than 3 carbon atoms. Thus preferably $R_3$ is at least 4 carbon atoms. More preferably the fabric conditioner is best retained when the $R_3$ is tertiary butyl and $R_4$ is hydrogen. However $R_3$ may be other butyl or higher alkyl groups or it may be other hydro-carbon groups containing at least 4 carbon atoms. $R_3$ can for instance be up to 30 carbon atoms or more, e.g. stearyl or lauryl. Generally effective results can be obtained using shorter alkyl groups and so $R_3$ is usually not more than 8 carbon atoms. The t-butyl group is also advantageous because it seems to render the monomer units containing it more resistant to alkaline hydrolysis.

$R_4$ is frequently hydrogen but it can be alkyl such as methyl, ethyl or higher alkyl or it can be other hydro carbon group. The total number of carbon atoms in $R_3$ and $R_4$ together is usually below 12, often below 8. $R_2$ is usually ethylene but it can be other linear or branched alkylene group containing two or more (for instance 2-4) carbon atoms. $R_1$ is usually methyl.

X can be NH, with the result that the cationic monomer is preferably a monoalkyl or dialkyl aminoalkyl (meth) acrylamide monomer, but preferably X is 0, with the result that the cationic monomer is preferably a monoalkyl or dialkyl aminoalkyl (meth) acrylate.

The hydrophobic monomer may be a hydrophobic as defined previously with regard to the ionisable polymer used in the coacervation process. The hydrophobic monomer can be a water-insoluble alkyl ester of methacrylic acid or other aliphatic, water-insoluble monomer such as methyl, ethyl or butyl acrylate or methacrylate. However the preferred hydrophobic monomers are for instance ethylenically unsaturated aromatic hydrocarbon monomers, such as styrenes, preferably styrene or a methyl styrene. Thus preferably the hydrophobic monomer is selected from the group consisting of styrene, methylstyrene methyl methacrylate, acrylonitrile, tertiary butyl methacrylate, phenyl methacrylate, cyclohexyl methacrylate and isobornyl methacrylate.

The amount of the cationic monomer which should be used will depend in part on the active ingredient which is entrapped within the monomer. The proportion of cationic free based monomer should be such that there is little or no release of the active ingredient during exposure to the wash water but that there is significant swelling and release of the active ingredient upon exposure to the wash or rinse water.

The degrees of swelling which will result in retention or release of the active ingredient depend in part on the molecular size of the active ingredient, in that good retention of an active ingredient of small molecular size requires that the polymer should be less swollen (when exposed to the detergent concentrate or wash water) than when the active ingredient has a higher molecular size. Similarly, good release when exposed to rinse water requires a higher degree of swelling for higher molecular size active ingredients than for lower molecular size active ingredients.

Generally the amount of cationic monomer will be within the range 5-30 mole % or 10-50 weight %. When, as is preferred, the free base monomer is t-butylaminoethyl methacrylate and the hydrophobic monomer is styrene, methyl styrene or methyl methacrylate, the amount of cationic monomer is preferably from 15%-45% by weight, most preferably around 30%-40% by weight.

The coating can be formed of recurring units of monomers consisting solely of the hydrophobic monomer and the free base cationic monomer but if desired minor amounts of other monomers may be included.

The coating on the coacervate shell wall may be provided for instance by the following steps, A) dispersing the uncoated particles into a water immiscible liquid, optionally containing an amphipathic polymeric stabiliser.

B) providing an aqueous solution containing a volatile solvent of a polymeric salt formed from a monomer blend which comprises said hydrophobic monomer and said free base monomer, which polymeric salt comprises a volatile counterion component, C) dispersing the polymer solution into the water immiscible liquid phase of A), and D) subjecting the dispersion to dehydration wherein water is evaporated from the aqueous particles thereby forming ionisable polymer coated particles, wherein the volatile counterion component of the salt is evaporated during the distillation and the matrix polymer is converted to its free base form.

Desirably the process also employs a polymeric amphipathic stabiliser in the water immiscible liquid. The amphipathic stabiliser may be a stabiliser already defined herein.

In the process of the present invention the dehydration step can be achieved by any convenient means. Desirably dehydration can be effected by subjecting the dispersion in oil to vacuum distillation. Generally this will require elevated temperatures, for instance temperatures of 30° C. or higher. Although it may be possible to use much higher temperatures e.g. 80 to 90° C. it is generally preferred to use temperatures of below 60 or 70° C.

Instead of vacuum distillation it may be desirable to effect dehydration by spray drying. Suitably this can be achieved by the spray drying process described in WO-A-97/34945.

The dehydration step removes water from the aqueous solution of matrix polymer and also the volatile counterion component, resulting in a dry polymer matrix which is insoluble an non-swellable in water, containing therein the fabric conditioner which is distributed throughout the polymeric matrix.

This process results in products which have enhanced effectiveness in that the polymer matrix which does not allow substantially any of the entrapped active ingredient to be released except when diluted, for instance immediately prior to or during the wash or rinse cycles of the laundry operation.

Alternatively the polymeric coating may be formed around the coacervate shell walls, for instance by a coacervation technique as described in EP-A-356239 or WO-A-92/20771 or, preferably, by interfacial condensation as described in, for instance, WO-A-97/24179. Preferably the particles have a shell (around the core) of a polyamide or other condensation polymer, preferably formed by interfacial condensation.

The polymeric coating can be further enhanced by including a cross-linking step in the process. This can be achieved by including self cross-linking groups in the polymer, for instance monomer repeating units carrying a methylol functionality. Preferably though the cross-linking is achieved by including a cross-linking agent with the ionisable polymer. The cross-linking agent are generally compounds which react with functional groups on the polymer chain.

The cross-linking process desirably occurs during the dehydration step. Thus where a cross-linking agent is included, it will generally remain dormant until the dehydration is started.

Generally the ionisable coating polymer may be prepared by any suitable polymerisation process. For instance the polymer can be conveniently prepared by aqueous emulsion polymerisation for instance as described in EP-A-697423 or U.S. Pat. No. 5,070,136. The polymer can then be neutralised by the addition of an aqueous solution of ammonium hydroxide or a volatile amine.

Generally the coating polymer has a molecular weight of up to 200,000 (Determined by GPC using the industry standard parameters). Preferably the polymer has a molecular weight of below 50,000, for instance 2,000 to 20,000. Usually the optimum molecular weight for the matrix polymer is around 8,000 to 12,000.

Typically the monomer blend may contain at least 50% by weight hydrophobic monomer, the remainder being made up of anionic monomer. Generally though the hydrophobic monomer will be present in amounts of at least 60% by weight.

The particles may be dispersed in a liquid detergent, for instance by blending a dispersion of particles (usually after dehydration) in a surfactant or in another water-immiscible liquid or in an water-immiscible liquid into the liquid detergent. Alternatively the particles may be distributed throughout solid detergent tablets or a detergent powder formulation. Thus in one preferred aspect of the invention we provide a detergent composition, which may be for instance in the form of a liquid detergent concentrate or a detergent tablet in which the particles are dispersed or distributed throughout the detergent composition and in which low molecular weight active ingredient is not released in the detergent composition but is released during the wash or rinse cycles of said laundry operation.

Typically the detergent composition comprises one or more surfactants, each of which may be anionic, non-ionic, cationic, or zwitterionic. The detergent will usually contain 0-50% of anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. It may also contain 0-40% of non-ionic surfactant such as alcohol ethoxylate (AEO or AE), carboxylated alcohol ethoxylates, nonylphenol ethoxylate, alkylpolyglycoside, alkyldimethylamine oxide, ethoxylated fatty acid monoethanolamide, fatty acid monoethanolamide, or polyhydroxy alkyl fatty acid amide (e.g. as described in WO 92/06154).

The detergent may comprise one or more polymers. Examples are carboxymethylcellulose (CMC), poly(vinylpyrrolidone) (PVP), polyethyleneglycol (PEG), poly(vinyl alcohol) (PVA), polycarboxylates such as polyacrylates, maleic/acrylic acid copolymers and lauryl methacrylate/acrylic acid copolymers.

The detergent may contain a bleaching system which may comprise a $H_2O_2$ source such as perborate or per carbonate which may be combined with a peracid-forming bleach activator such as tetraacetylethylenediamine (TAED) or nonanoyloxybenzenesulfonate (NOBS). Alternatively, the bleaching system may comprise peroxyacids of, e.g., the amide, imide, or sulfone type.

The detergent, if built, may contain 1-65% of a detergent builder or complexing agent such as zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g. SKS-6 from Hoechst). In accordance with the present invention the detergent builder is an active ingredient entrapped within the aminoplast particles.

The detergent composition may be stabilized using conventional stabilizing agents, e.g. a polyol such as propylene glycol or glycerol, a sugar or sugar alcohol, lactic acid, boric acid, or a boric acid derivative such as, e.g., an aromatic borate ester, and the composition may be formulated as described in, e.g., WO 92/19709 and WO 92/19708.

The detergent may also contain other conventional detergent ingredients dyes, bactericides, optical brighteners, or perfume.

The following examples illustrate the invention.

EXAMPLE 1

Preparation of Aminoplast Capsules

An aqueous phase comprising the citric acid (40 g), water (60 g) and a Melamine/Formaldehyde resin Beetle PT336 (20 g) were mixed. An oil phase prepared by mixing an isoparaffinic solvent (Isopar G, 300 g) and an amphipathic polymeric stabiliser (2 g). The aqueous and oil phases mixed to form a water in oil dispersion. The dispersion was heated to 70° C. for three hours and the dispersion was dehydrated using vacuum distillation. The beads were recovered by filtration and air dried.

EXAMPLE 2

Coating the Aminoplast Capsules

The coating polymer comprising 35 weight % tertiary butyl amino ethyl methacrylate and 65 weight % methyl methacrylate was prepared thermally in alcoholic solvent at 35% active content. The molecular weight of the polymer was 25-30 000. Water containing acetic acid was added and the alcoholic solvent removed via vacuum distillation and the polymer converted to the amine-acetate form.

The product of example 1 were redispersed in Isopar isoparaffinic solvent. The coating polymer and butyl acetate was mixed into the dispersion. The dispersion was then subjected to vacuum distillation until the solvent was removed. Once all solvent removed, the beads were recovered by filtration and air dried.

EXAMPLE 3

Evaluation studies showed that the products of examples 1 and 2 did not release any citric acid in a liquid detergent concentrate, but that on dilution analogous to the water in the wash cycle, complete release of the citric acid was achieved.

EXAMPLE 4

Preparation of Urea Formaldehyde Aminoplast Capsules

An aqueous solution of formaldehyde (74 g of a 37% weight/volume) is prepared and the pH was adjusted to 7.5 using sodium hydroxide. Urea (4 g) is combined with this solution. The mixture is poured into a suspending medium of liquid paraffin (1,100 ml) including Span 85 emulsifier (40 ml) and petroleum ether (50 ml bpt range 100-120° C.). The mixture was heated and maintained at a temperature of 82° C. for 2 hours, whilst being stirred and maintained under a nitrogen atmosphere. The product was then acidify to pH 5 using acetic acid and stirred for a further 16 hours. The beads were decanted off and washed with a mixture of water and acetone. The beads were then post cured by mixing with ammonium chloride (6% w/w) at 105° C. for 17 hours. The resulting beads were wash with a mixture of water and acetone and then dried under vacuum.

EXAMPLE 5

Preparation of Urea Formaldehyde Aminoplast Capsules Containing Citric Acid

Example 4 was repeated except that 6 g of citric acid was included into the aqueous phase.

Evaluation studies indicated that all of the citric acid had been encapsulated and that non of the citric acid was released in a high electrolyte environment analogous to a detergent concentrate. Further evaluation showed that the capsules ruptured and that all of the citric acid was released when the capsules were subjected to a more dilute aqueous environment as in wash water or rinse water.

EXAMPLE 6

Preparation of Microcapsules by Coacervation from LCST Polymer

An aqueous phase is prepared by dissolving 0.1 g of a blue dye into 100 g of polyvinyl alcohol solution at 10% solids (Gohsenol KP08). This is added to an oil phase comprising 1.7 g of 30% amphipathic stabiliser (random copolymer of ethylenically unsaturated hydrophobic and hydrophilic monomers as defined herein) and 300 g of a hydrocarbon oil under mechanical agitation at 22° C. After 5 minutes agitation, droplets of aqueous phase are formed having a mean particle diameter of around 200 microns. The temperature of the water-in-oil emulsion is raised to 60° C. to introduce polyvinyl alcohol coacervation to form a coating at the water-oil interface. The mixture is maintained at 60° C. for 30 minutes to complete the coacervate coating process. The polyvinyl alcohol coacervate is then hardened by adding 5 ml of 50% glutaraldehyde solution and keeping the mixture for 2 hours at 60° C. and then a further hour at 80° C. tro complete the cross-linking reaction.

The microcapsule suspension in oil is cooled and the microcapsules recovered by filtration. The microcapsules were then examined under a light microscope and the presence of the core shell structure was clear apparent.

The invention claimed is:

1. A particulate composition comprising particles which consist of a shell wall surrounding a hydrophilic core, wherein the shell wall is formed from a polymeric coacervate and wherein the particles comprise a polymeric amphipathic stabiliser in which the polymeric amphipathic stabiliser at least partially coats the exterior surface of the shell wall.

2. A composition according to claim 1 in which the polymeric amphipathic stabiliser is formed by copolymerising at least one hydrophilic ethylenically unsaturated monomer with at least one hydrophobic ethylenically unsaturated monomer.

3. A composition according to claim 1 in which the shell wall comprises an aminoplast resin.

4. A composition according to claim 1 in which the shell wall is formed from a compound containing at least two amide and/or amine groups and an aldehyde.

5. A composition according to claim 1 in which the shell wall is formed from an low critical solution temperature polymer.

6. A composition according to claim 1 in which the polymeric coacervate is cross-linked.

7. A composition according to claim 1 in which the shell wall is formed from a salt of an ionisable polymer with a volatile counterion,
wherein the ionisable polymer is selected from polymers of
(i) an ethylenically unsaturated free base amine and in which the counterion is derived from a volatile acid,
(ii) in which the ionisable polymer is selected from polymers of an ethylenically unsaturated free acids, wherein the counterion is derived from a volatile base.

8. A composition according to claim 1 in which the ionisable polymer is formed from a co-polymer of
(a) an ethylenically unsaturated hydrophobic monomer with
(b) either
(i) a free base monomer of the formula

where $R_1$ is hydrogen or methyl, $R_2$ is alkylene containing at least two carbon atoms, X is O or NH, $R_3$ is a hydrocarbon group and $R_4$ is hydrogen or a hydrocarbon group or
(ii) a free carboxylic acid monomer.

9. A composition according to claim 8 in which $R_4$ is hydrogen, $R_3$ is at least 4 carbon atoms, in which $R_1$ is methyl, $R_2$ is ethylene and X is O.

10. A composition according to claim 8 in which the free carboxylic acid monomer is acrylic acid or methacrylic acid.

11. A composition according to claim 8 in which the hydrophobic monomer is selected from the group consisting of monomers which are capable of forming a homopolymer of glass transition temperature in excess of 50° C.

12. A composition according to claim 8 in which the hydrophobic monomer is selected from the group consisting of styrene, methyl methacrylate, acrylonitrile, tertiary butyl methacrylate, phenyl methacrylate, cyclohexyl methacrylate and isobornyl methacrylate.

13. A composition according to claim 8 in which the polymer is a co-polymer of 55-85 weight % of methyl methacrylate with 15%-45% by weight tertiary butylaminoethyl methacrylate.

14. A composition according to claim 8 in which the polymer is a co-polymer of 55-85 weight % of methyl methacrylate with 15%-45% by weight ammonium methacrylate.

15. A composition according to claim 1 in which the particles are coated by an ionisable polymer.

16. A composition according to claim 15 in which the ionisable polymer is a polymeric salt formed from a monomer blend which comprises an hydrophobic ethylenically unsaturated monomer and a salt of a free base monomer with a volatile counterion.

17. A composition according to claim 1 in which the particles are 90% by weight below 30 microns.

18. A composition according to claim 1 in which the core material is aqueous.

19. A composition according to claim 1 in which the core material comprises a low molecular weight active ingredient.

20. A composition according to claim 1 in which the active ingredient has a molecular weight less than 1,000.

21. A composition according to claim 1 in which the core material comprises a buffering system and/or a sequesterant and/or detergent builder.

22. A composition according to claim 1 in which the core material comprises citric acid.

23. A process of producing a particulate composition comprising particles which consist of a shell wall surrounding a hydrophilic core, comprising the steps of
a) forming an aqueous liquid that contains a wall building material that is capable of forming the shell wall by coacervation,
b) dispersing the aqueous liquid into a water immiscible liquid, which comprises a stabilising substance to form a dispersion that comprises aqueous droplets dispersed in a continuous phase of water immiscible liquid,
c) subjecting the dispersion to coacervation conditions, such that the wall building material coacervates at the surface of the aqueous droplets,
characterised in that the stabilising substance comprises a polymeric amphipathic stabiliser in which the polymeric amphipathic stabiliser at least partially coats the exterior surface of the shell wall.

24. A process according to claim 23 in which the polymeric amphipathic stabiliser is formed by copolymerising at least one hydrophilic ethylenically unsaturated monomer with at least one hydrophobic ethylenically unsaturated monomer.

25. A process according to claim 23 in which the polymeric amphipathic stabiliser is in association with the surface of the aqueous droplets during step (c).

26. A process according to claim 23 in which the wall building material is an aminoplast prepolymer and the shell wall comprises an aminoplast resin.

27. A process according to claim 26 in which the wall building material is a compound containing at least two amide and/or amine groups with an aldehyde.

28. A process according to claim 26 in which the coacervation conditions comprise elevating the temperature of the dispersion to above 50° C. sufficient for the wall building material to form an aminoplast resin.

29. A process according claim 23 in which the wall building material is a low critical solution temperature polymer.

30. A process according to claim 29 in which the coacervation conditions comprise elevating the temperature of the dispersion to above the critical solution temperature, such that the low critical solution temperature polymer deposits at the surface of the aqueous droplets, thus forming a shell and then stabilising the shell by cross-linking.

31. A process according to claim 23 in which the wall building material is a salt of an ionisable polymer with a volatile counterion.

32. A process according to claim 31 in which the ionisable polymer is a polymer formed from a co-polymer of
(a) an ethylenically unsaturated hydrophobic monomer with
(b) either
(i) a free base monomer of the formula

where $R_1$ is hydrogen or methyl, $R_2$ is alkylene containing at least two carbon atoms, X is O or NH, $R_3$ is a hydrocarbon group and $R_4$ is hydrogen or a hydrocarbon group or
(ii) a free carboxylic acid monomer.

33. A process according to claim 31 in which the coacervation conditions comprise elevating the temperature of the dispersion sufficient to remove the volatile counterion, such that the ionisable polymer deposits at the surface of the aqueous droplets thus forming a shell and then optionally stabilising the shell by cross-linking.

34. A process according to claim 23 in which the particles are coated by an ionisable polymer.

35. A process according to claim 34 in which the particles are coated by the following steps,
A) dispersing the uncoated particles into a water immiscible liquid, optionally containing an amphipathic polymeric stabiliser thereby forming a dispersion,
B) adding to an aqueous solution containing a salt of an ionisable polymer with a volatile counterion,
C) dispersing the polymer solution into the water immiscible liquid phase of step A), and
D) subjecting the dispersion to dehydration wherein water is evaporated from the aqueous particles thereby forming ionisable polymer coated particles, wherein the volatile counterion component of the salt is evaporated during the distillation and the ionisable polymer is converted to its free base or acid form.

36. A process according to claim 35 in which the ionisable polymer is a polymeric salt formed from a monomer blend which comprises said hydrophobic monomer and a salt of a free base monomer with a volatile counterion.

37. A process according to claim 23 in which the water immisible liquid is a hydrocarbon or a silicone oil.

38. A process according to claim 23 in which the particles consist of a shell wall surrounding a hydrophilic core, wherein the shell wall is formed from a polymeric coacervate and wherein the particles comprise a polymeric amphipathic stabiliser.

39. A liquid detergent concentrate or a solid detergent tablet comprising a composition defined in claim 1 wherein the hydrophilic core material is not released in the concentrate but is released during the wash or rinse cycle of a laundry operation.

40. A liquid detergent concentrate or a solid detergent tablet comprising a composition made by the process of claim 23 wherein the hydrophilic core material is not released in the concentrate but is released during the wash or rinse cycle of a laundry operation.

* * * * *